United States Patent Office 3,120,502
Patented Feb. 4, 1964

3,120,502
FRIEDEL-CRAFTS CATALYSIS OF THE REACTION OF NONHYDROXYL CONTAINING ACETALS WITH ISOCYANATES
Rudolf Merten, Cologne-Mulheim, Germany, assignor to Farbenfabriken Bayer Aktiengesellschaft, Leverkusen, Germany, a corporation of Germany
No Drawing. Filed June 19, 1959, Ser. No. 821,360
Claims priority, application Germany June 20, 1958
12 Claims. (Cl. 260—77.5)

The invention relates to new condensation products and to a process for producing same.

It is known to react mono- and polyisocyanates with compounds containing one or more active hydrogen atoms. Thus for instance reaction of an NCO group with a hydroxyl group produces a urethane group; with an amino group produces a urea group, and the like. It has now surprisingly been found that isocyanates can also be reacted with compounds that do not contain active hydrogen atoms but that contain acetal groups.

The present invention, therefore, provides new condensation products which are produced by reacting together isocyanates with compounds containing linear or cyclic acetal groups. The object of the invention is further to describe a process for the production of these condensation products in which one or more monoisocyanates and/or one or more polyisocyanates are reacted in the presence of a Friedel-Crafts catalyst with one or more compounds each containing one or more linear and/or cyclic acetal groups.

Any acetal is useful in the present procedure. The acetal starting material can contain one or more acetal groups which can be cyclic or linear. Acetals which contain linear as well as cyclic acetal groups are included. Suitable linear monoacetals are inter alia those derived from an oxo compound, such as formaldehyde, acetaldehyde, propionaldehyde, butyric aldehyde, β-chloro-acetaldehyde or benzaldehyde and naphthaldehyde and an unsubstituted or substituted monohydric alcohol. Included in this category are the acetals of methanol, ethanol, β-chloro-ethanol, propanol-1, propanol-2, butanol-1, butanol-2, 2-methyl-propanol-1, benzyl alcohol, furfuryl alcohol, cyclohexanol, allyl alcohol and oleyl alcohol. Also suitable are acetals of hydroxy compounds, such as are obtained by reacting alkylene oxides such as ethylene oxide, propylene oxide, butylene oxide, epichlorhydrin or styrene oxide with the afore-mentioned alcohols and with phenols. Acetals with aromatically bonded acetal groups, such as the acetals of formaldehyde and acetaldehyde with phenol, cresol, xylene or naphthol, are also suitable for employment in the process of the present invention. Furthermore, compounds having an acetal group which is partially cyclic and partially linear are to be mentioned, such as the α-alkoxytetrahydrofurans and the α-alkoxytetrahydropyrans.

As examples of compounds containing several acetal groups which may be employed in the present process there may be mentioned the reaction products of the aforementioned alcohols and phenols with polyoxo compounds such as glyoxal, malonic dialdehyde, succinidialhyde and terephthaldialdehyde.

Other suitable compounds containing more than one acetal group including cyclic groups are the reaction products of an oxo compound, such as those already referred to, with a polyhydroxy compound. Suitable polyhydroxy compounds are, for example, polyhydric alcohols such as the pentane diols, the hexanediols, 7,18-dihydroxy octadecane, 2-butene-1,4-diol, 2-butine-1,4-diol, the butanetriols, trimethylol propane glycerine, the hexanetriols, sorbitol, 4,4'-dihydroxy dicyclohexyl methane, 4,4'-dihydroxy dicyclohexyl dimethyl methane, hydroquinone and 4,4'-dihydroxy diphenylmethane and 4,4'-dihydroxy diphenyl dimethylmethane. As the alcohol component in the formation of the polyacetals, it is also possible to use the reaction products of alkylene oxides, such as ethylene oxide, propylene oxide, butylene oxide, styrene oxide, epichlorhydrin and tetrahydrofuran, with either the aforementioned alcohols and phenols or with other alcohols and phenols which themselves would form cyclic monoacetals, such as ethylene glycol, propane-1,2-diol, propane-1,3-diol, butanediols or brenzcatechol. Also suitable as alcoholic components are the polycondensates of alkylene oxides having terminal OH groups, the reaction products of the aforementioned polyhydroxy compounds with alcohols and acids, such as, for example, glycerine-monomethyl methacrylate, as well as polymers and copolymers thereof, polyesters containing hydroxyl groups, such as castor oil, phthalic acid-bis-glycol ester, ricinoleic acid glycol ester, polyesters, for example of glycol and adipic acid, fumaric acid or maleic acid; also polythioethers having terminal hydroxy groups, completely or partially saponified polyvinyl acetates and reaction products of acid amides and alkylene oxides containing hydroxy groups, such as, for example, adipic acid-bis-oxy ethyl methyl amide. The afore-mentioned monohydric alcohols can also be used in admixture with such polyhydroxy compounds.

As polyacetals, there may also be employed the reaction products of alcohols with alkines such as acetylene or 2-butine-1,4-diol; trans-acetalisation products of an acetal of an alcohol having a lower boiling point and a polyhydroxy compound of higher boiling point, for example of dibutyl acetaldehyde acetal and hexane-1,6-diol; further, soluble, high molecular weight polymers of formaldehyde and acetaldehyde. Included among suitable polyacetals are those condensation products of xylene and formaldehyde which contain acetal groups.

As examples of compounds containing one or more cyclic acetal groups possibly together with linear groups, there may be mentioned the reaction products of one of the afore-mentioned oxo compounds with a polyhydroxy compound which has a steric configuration favourable for the formation of cyclic acetals. Polyhydroxy compounds of this type are, for example, polyhydric alcohols which contain an $\alpha,\beta$-, $\alpha,\gamma$- or $\alpha,\delta$-diol configuration, such as ethylene glycol, propane-1,2-diol, propane-1,3-diol, butane-1,2-diol, butane-1,3-diol, butane-1,4-diol, 2-butene-1,4-diol, glycerine, trimethylol propane, tetramethylol cyclohexanol, pentaerythritol, sorbitol, the butane triols and hexane triols; also etherified and esterified polyhydroxy compounds provided they still contain the corresponding diol group. Glycerine monoesters and monoethers, trimethylol propane monoesters and monoethers may be mentioned as examples of suitable etherified and esterified polyhydroxy compounds. Various polyvinyl acetals are also suitable for employment in the present process.

The alcohols, phenols and aldehydes may further be substituted in any desired manner with, for example, halogen atoms, ester, amide, nitro, ether, thioether, sulpho, carboxyl or urethane groups, and also heterocyclic rings. It is possible to use mixtures of acetals as well as polyacetals which contain both linear and cyclic acetal groups in the molecule. The acetals may also contain hydrogen atoms capable of reacting with isocyanates, for example in the form of hydroxyl, carboxyl, and primary or secondary amino groups. When the acetals are reacted with isocyanates, these additional groups containing hydrogen atoms capable of reacting with isocyanates are transformed in known manner into urethanes, amides or ureas, prior to, simultaneously with, or even after the reaction of the isocyanate groups with acetal groups in accordance with the invention. Any hydrogen atoms which are present and which are capable of reacting with isocyanates can, of course, be blocked by converting the functional groups containing them into ether, ester or amide groups prior to carrying out the reaction in accordance with the invention.

As monoisocyanates and polyisocyanates, there may be employed in the process of the present invention any substituted or unsubstituted aromatic or aliphatic compound containing one or more isocyanate groups. Suitable mono- and polyisocyanates include, inter alia, aromatic monoisocyanates such as phenyl isocyanate, alkyl- or aryl phenyl isocyanates, such as o,m,p-tolyl isocyanate, xylyl isocyanates, diphenyl isocyanate-4, diphenyl methane isocyanate-4, halophenyl isocyanates such as p-chlorophenyl isocyanate, p-bromophenyl isocyanate, nitrophenyl isocyanates such as p-nitrophenyl isocyanate, 1-methyl-2-nitro-phenyl isocyanate-4, alkoxyphenyl isocyanates such as p-ethoxyphenyl isocyanate, carbalkoxy phenyl isocyanates such as m-carbmethoxy phenyl isocyanate, p-cyanophenyl isocyanates and isocyanato benzyl ethers; araliphatic, aliphatic or hydroaromatic isocyanates such as methyl isocyanate, ethyl isocyanate, butyl isocyanate, allyl isocyanate, chloropropyl isocyanates and isocyanato acetic acid esters; polyisocyanates such as tetramethylene diisocyanate, hexamethylene diisocyanate, thiodipropyl diisocyanate, ω,ω'-diisocyanato diethyl benzenes and naphthalenes, cyclohexane diisocyanates, aryl diisocyanates such as m,p-phenylene diisocyanate, naphthylene-1,5-diisocyanate, and polyisocyanates of alkyl and aryl substitution products of benzene and naphthalene, toluylene diisocyanate 2,4 and toluylene diisocyanate-2,6,4,4'-diphenylmethane diisocyanate, and 3,5-diethyl-toluylene diisocyanate-2,4, as well as partial hydrogenation products thereof, 3 - (α - isocyanato ethyl)-phenyl isocyanate, diphenyl ether polyisocyanates and diphenyl sulphone polyisocyanates. There may also be employed in the present process compounds containing isocyanate groups and which have been obtained by reacting an excess of the aforementioned polyisocyanates with compounds containing active hydrogen atoms, such as alcohols, phenols, amines, polyesters, polyethers, polythioethers, and polyacetals.

Mixtures of isocyanates can also be employed; and in one particular embodiment of the invention there are employed compounds containing both isocyanate and acetal groups in the molecule.

Such compounds can be produced for instance by reacting a linear polyacetal with terminal OH groups with an excess of a diisocyanate to form an isocyanate-modified polyacetal containing a terminal NCO group.

Any Friedel-Crafts catalysts can be employed in the process of the invention. Examples are boron halides such as boron trifluoride and boron trichloride and addition products thereof, e.g. with diethylether, tetrahydrofuran and acetic acid; acids such as sulphuric acid, phosphoric acid, hydrochloric acid and perchloric acid; acid chlorides such as the phosphorous chlorides, chlorosulphonic acid, fluorosulphonic acid; sulphochlorides, anhydrous metal halides such as $FeCl_3$, $CrCl_3$, $SbCl_5$ and $SnCl_4$; sulphonic acids, e.g. p-toluene sulphonic acid and sulphonated polystyrenes, such as those known as acid ion exchangers.

The quantity of catalyst employed in the process according to the present invention depends largely on the nature of the catalyst, particularly on its polarity and also on the nature of the reactants. The catalyst is preferably employed in an amount of from 0.1% to 30%, preferably 0.5–10% by weight, based on the total weight of the reactants.

The reactants and catalyst may be combined in any desired sequence in the process according to the present invention. For example a mixture of the acetal and catalyst may be introduced into the reaction vessel and the isocyanate added dropwise to this mixture, or alternatively the mixture of catalyst and acetal may be added to the isocyanate. On the other hand, it is also possible to mix the catalyst with the isocyanate and to add the acetal dropwise to this mixture or alternatively to add the mixture of catalyst and isocyanate dropwise to the acetal. It is also possible to add a mixture of the isocyanate and acetal to the catalyst or the three components can be individually introduced into the reaction vessel.

The process of the present invention may be carried out at any temperature from room temperature to 200° C. It is also possible to perform the reaction at a temperature below zero. In many cases, the isocyanate groups disappear at relatively low temperatures, for example below 80° C. By heating the products to a temperature of from 100° C. to 150° C. an exothermic reaction takes place so that it is frequently advantageous to carry out the entire reaction above this transformation temperature in order to control the reaction.

In many cases it is advantageous to carry out the process in the presence of a solvent. Suitable solvents include, inter alia, aliphatic and aromatic hydrocarbons, chlorinated hydrocarbons, ethers, esters and ketones such as benzene, toluene, xylene, chlorobenzene, o-dichlorobenzene, carbon tetrachloride, methylene chloride, chloroform, diethylether, dibutylether, ethyl acetate, butyl acetate, acetone, methylethyl ketone, cyclohexanone. The solvents employed must of course be inert to the reactants and products under the reaction conditions.

The ratio of acetal groups to isocyanate groups may be varied within wide limits. A complete conversion generally results from the employment of a ratio of acetal groups to isocyanate groups of 1 to 2. In this case, neither free isocyanate groups nor free acetal groups are found in the reaction products. When larger quantities of acetals are employed, for example when reacting molar quantities of formaldehyde-dimethyl acetal and phenyl isocyanate, the excess acetal has to be distilled off. Small amounts of methanol are also obtained as a by-product of side reactions. The use of smaller quantities of acetal gives rise to products containing free isocyanate groups.

When aliphatic isocyanates are employed in the process of the present invention highly viscous and usually tacky products are obtained, while the reaction of acetals with aromatic mono- and polyisocyanates gives rise to resinous products which are usually transparent but still soluble. The reaction mechanism of the new process leading to the new condensation products is not completely understood. The mechanism involved produces inter alia urethane groups. The acetal obviously results as a bifunctional compound so that the employment of monoisocyanates results in the production of a molecule containing at least two urethane groups. The employment of polyisocyanates yields derivatives containing more of these functional groups per molecule, in the above-mentioned cases products containing free isocyanate groups besides the urethane groups. However, the invention as described herein, is not restricted to a specific theory of reaction mechanism.

The products obtained by the present process can be used in very many different fields. In combination with polyhydroxy compounds they are excellently suitable for use in stoving lacquers and those products which still contain an isocyanate group can be employed as the isocyanate component in the manufacture of lacquers, foam materials or coatings by the well-known isocyanate polyaddition process.

In order that the invention may be more clearly understood the following examples are given by way of illustration only.

*Example 1*

76 parts by weight of anhydrous formaldehyde-dimethyl acetal (1 mol) having a methanol content of less than 2% are mixed, with exclusion of moisture, with 3 ml. of boron trifluoride etherate. The mixture is heated under reflux and 119 parts by weight of phenyl isocyanate (1 mol) are added dropwise over a period of 2 hours, the internal temperature being slowly raised as the boiling point increases. By the time approximately ¼ of the total quantity of the isocyanate has been added, an internal temperature of from 60° C. to 65° C. has been reached, which is maintained during the addition of the remainder of the isocyanate, if necessary by occasional cooling. The reaction proceeds slightly exothermally, the reaction mixture becoming a faint red colour. The reaction mixture at this stage is a thin liquid and the isocyanate content thereof is practically 0%. When all the isocyanate has been added the temperature of the reaction mixture is increased, the methylal and methanol being distilled off, when the temperature reaches 100° C. to 120° C. it rises spontaneously by approximately 40° C. to 50° C. The reaction mixture is then heated for an hour at 170° C. and the reaction product thereby obtained is allowed to solidify as a reddish-yellow transparent resin by cooling on a dry plate. The distillate yields about 40% of formaldehyde dimethyl acetal and 10% of methanol, based on the methylal introduced.

The resin obtained does not contain any isocyanate groups, has good solubility in the conventional solvents, such as glycol monomethyl ether acetate, acetone and acetic ester, and softens at a temperature above 50° C.

Analysis shows 20.55% O and 8.57% N. Theoretical values for an addition product of 2 mols of phenyl isocyanate and 1 mol of formaldehyde dimethyl acetal are 21.0% O and 8.9% N.

50 parts by weight of the resin prepared as described above are dissolved in 50 parts by weight of glycol monomethyl ether acetate and mixed with a solution of 42 parts by weight of a polyester consisting of 2.5 mols of adipic acid, 0.5 mol of phthalic acid and 4 mols of trimethylol propane (12.55% OH, acid number 1.8) in 30 ml. of acetic ester and stoved at a temperature of from 210° C. to 220° C. on a metal surface. A very hard film is thus obtained which is resistant to solvents.

*Example 2*

A mixture of 119 parts by weight of phenyl isocyanate (1 mol) and 3 ml. of $BF_3$-etherate are heated to 60° C. and 72 parts by weight of formaldehyde dimethyl acetal (1 mol) are added to the mixture over a period of 2 hours. The temperature is maintained at 60° C. for 5 hours at the end of which time the isocyanate content was found to be 0%. The resulting product can be further processed as described in Example 1 to give the same products.

*Example 3*

87 parts by weight of toluylene-2,4-diisocyanate (0.5 mol) are added in a manner analogous to that of Example 1 to a mixture of 76 parts by weight of formaldehyde dimethyl acetal (1 mol) and 3 ml. of $BF_3$-etherate at a temperature of 60° C., the addition being carried out over a period of 2 hours. The reaction mixture is maintained at a temperature of 60° C. for 6 hours at the end of which time the isocyanate content had fallen to 2%. The mass is poured onto a dry plate and heated in a drying chamber to 140° C. In this way, a very brittle material is obtained which is less soluble than the product obtained according to Example 1.

*Example 4*

80 parts by weight of m-phenylene diisocyante (0.5 mol) are added dropwise in a manner analogous to that of Example 1 by means of a superheated steam funnel to a mixture of 76 parts by weight (1 mol) of formaldehyde dimethyl acetal and 5 ml. of $BF_3$-etherate at a temperature of 60° C., the addition being carried out over a period of 2 hours. The very thick liquid mass is heated at 140° C. in a manner analogous to that of Example 3. A brittle resin is thus obtained which can be dissolved in glycol monomethyl ether acetate to give a 50% solution.

50 parts by weight of the reaction product of this example are dissolved in 50 parts by weight of glycol monomethyl ether acetate, mixed with a solution of 62 parts by weight of the polyester employed in Example 1 in 20 ml. of acetic ester and 20 ml. of toluylene and stoved at 210° C. for 90 minutes on a metal surface, whereby a brittle film is obtained which is resistant to solvents. By using 80 parts by weight (0.5 mol) of p-phenylene diisocyanate instead of m-phenylene diisocyanate, an analogous reaction product is obtained.

*Example 5*

250 parts by weight (1 mol) of diphenyl methane-4,4'-diisocyanate are added dropwise in a manner analogous to that of Example 1 by means of a superheated steam funnel to a mixture of 76 parts by weight (1 mol) of formaldehyde dimethyl acetal and 5 ml. of $BF_3$-etherate at a temperature of 60° C., the addition being carried out over a period of 2 hours and the temperature being gradually raised to 160° C. after 50% of the total quantity of isocyanate has been added. A brittle, resinous and only slightly soluble material is obtained.

*Example 6*

76 parts by weight of formaldehyde dimethyl acetal (1 mol) and 6 ml. of $BF_3$-etherate are mixed in a manner analogous ot that of Example 1 with 238 parts by weight of phenyl isocyanate (2 mols). Immediately on completion of the addition of the isocyanate, the isocyanate content is 0.8%. The temperature of the reaction mixture is gradually increased to 160° C. the temperature rising spontaneously from approximately 120° C. to 156° C. without any reaction being detected. The temperature is maintained at 160° C. for 30 minutes but no distillate is obtained, even in vacuo. The product is poured on to a dry plate and solidifies to form a brittle resin, the properties of which are similar to those of the product obtained according to Example 1.

In a second experiment 100 parts by weight of chlorobenzene are also added to the acetal-catalyst mixture previously described in this example, the isocyanate in this case being added dropwise at a temperature of from 60° C. to 70° C. After all the isocyanate has been added, the temperature of the reaction mixture is raised to 150° C. the spontaneous heating effect already described commencing at approximately 135° C. The solvent is removed in vacuo.

The product obtained gave the following analysis: 9.09% N, 20.19% O, molecular weight=304. Theoretical analysis for an addition product of 1 mol of formaldehyde dimethylacetal and 2 mols of phenyl isocyanate: 8.93% N, 20.40% O, molecular weight=314.

If the reaction is carried out using 12 parts by weight of antimony pentachloride instead of $BF_3$-etherate, a dark violet product is obtained which otherwise possesses the same properties as the product obtained using $BF_3$-etherate.

*Example 7*

A mixture of 38 parts by weight of formaldehyde dimethyl acetal (0.5 mol) and 3 ml. of sulphuric acid are added, at a temperature of 80° C. and in a manner analogous to that of Example 6, to a mixture of 119 parts by weight of phenyl isocyanate (1 mol) and 1 ml. of concentrated sulphuric acid. An oily flocculation is initially formed in the isocyanate on adding the sulphuric acid thereto. The reaction commences, however, immediately the acetal is added and towards the end of the addition to the acetal, the caked precipitate again completely disappears. A product analogous to that of Example 6 is obtained.

By adding 1 ml. of tin tetrachloride to the isocyanate and 3 ml. of tin tetrachloride to the acetal, instead of sulphuric acid, an experiment carried out under the above described conditions gives an identical reaction product.

By adding 12 parts by weight of a polystyrene sulphonic acid cross-linked with 1% of divinyl benzene to

Example 8

Solutions of (a) 238 parts by weight of phenyl isocyanate (2 mols) and 160 parts by weight of m-phenylene diisocyanate (1 mol) and (b) 152 parts by weight of formaldehyde dimethyl acetal (2 mols) and 8 ml. of BF$_3$-etherate, are mixed at a temperature of 60° C., the heat of reaction which is set up being moderated by occasional cooling. Towards the end of the mixing the temperature of the mixture rises to from 160° C. to 170° C. because the reaction is exothermic. The temperature is maintained at from 160° C. to 170° C. for a short time without, however, obtaining a distillate. The reaction product solidifies on a dry plate as a resin which shows good solubility in acetic ester and glycol monomethyl ether acetate. The resin was found to contain no free isocyanate and gave the following analysis: 10.48% N, 23.77% O, molecular weight 394. Theoretical analysis for an addition product of 2 mols of formaldehyde dimethyl acetal, 1 mol of m-phenylene diisocyanate and 2 mols of phenyl isocyanate: 10.18% N, 23.23% O, molecular weight 550.

A 50% solution of the product of this example in glycol monomethyl ether acetate is transformed as described in Example 1 into a stoving lacquer which is found to possess the same properties as the stoving lacquer described in Example 1.

Example 9

Mixtures of (a) 238 parts by weight of phenyl isocyanate (2 mols) and 250 parts by weight of diphenyl methane-4,4'-diisocyanate (1 mol) and (b) 152 parts by weight of formaldehyde dimethyl acetal (2 mols) and 8 ml. of BF$_3$-etherate are run into 200 ml. of chlorobenzene as in Example 1 over a period of 2 hours and at a temperature of from 60° C. to 70° C. The temperature is then raised to 150° C. whereupon a spontaneous heating effect occurs and the solvent is distilled off. The residue is worked up in a manner analogous to that of Example 8 and the reaction product shows similar properties to that of Example 8.

The reaction product gave the analysis: 8.89% N, 20.17% O, molecular weight 493. Theoretical analysis for an addition product of 2 mols of formaldehyde dimethyl acetal, 2 mols of phenyl isocyanate and 1 mol of diphenyl methane-4,4'-diisocyanate: 8.74% N, 19.98% O, molecular weight 640.

Example 10

168 parts of hexamethylene diisocyanate (1 mol) and a mixture of 76 parts by weight of formaldehyde dimethyl acetal (1 mol) and 10 ml. of BF$_3$-etherate are simultaneously added dropwise with stirring and with exclusion of moisture to 100 parts by weight of chlorobenzene, which has been heated to 130° C. The addition is effected within a period of 4 hours and after the addition is complete the isocyanate content of the reaction mixture is zero. The temperature is maintained at 130° C. for 30 minutes and the solvent is then distilled off in vacuo, leaving a dark brown viscous mass which has good solubility in acetone, acetic ester and methyl glycol acetate.

50 parts by weight of this product are dissolved in 20 ml. of glycol monomethyl ether acetate and 30 ml. of acetic ester. 56 parts by weight of the polyester described in Example 1 are then added to the solution and the mixture is stoved at a temperature of from 220° C. to 230° C. on a metal surface to form an elastic film which is resistant to solvents.

Example 11

A mixture of (a) 174 parts by weight of toluylene-2,4-diisocyanate (1 mol) and 238 parts by weight of phenyl isocyanate (2 mols), (b) 152 parts by weight of formaldehyde dimethyl acetal (2 mols) and (c) 8 ml. of BF$_3$-etherate is added, with stirring and exclusion of moisture, to 150 parts by weight of chlorobenzene at a temperature of 130° C., the addition taking place over a period of 2 hours by which time the heat of reaction has been dissipated and there is no further heat of reaction on heating the reaction mixture to 150° C. The reaction product is discharged without removing the solvent. The 79% highly viscous solution obtained does not contain any free isocyanate and can be used, in combination with pure polyhydroxy compound, as a lacquer for wire.

Example 12

160 parts by weight of a polyacetal of diethylene glycol and formaldehyde (OH number 141) are mixed, with stirring and exclusion of air moisture, with 8 ml. of BF$_3$-etherate. Another 300 parts by weight of phenyl isocyanate are added at 40° C. and the mixture is heated in a closed vessel in a drying chamber to 140° C. After 1 hour, the mixture is allowed to cool and a solid brittle plastic is thereby obtained which is practically insoluble in the conventional solvents. Free isocyanate can no longer be detected in the product.

Example 13

348 parts by weight of toluylene-2,4-diisocyanate (2 mols) are heated to a temperature of from 140° C. to 145° C. and a mixture of 76 parts by weight of formaldehyde dimethyl acetal (1 mol) and 5 ml. of BF$_3$-etherate is then introduced dropwise, with stirring and exclusion of moisture, over a period of 3 hours. A strongly exothermic reaction immediately commences. On completion of the addition of the acetal and BF$_3$-etherate the isocyanate content of the reaction mixture is found to be 18.2% (theoretical 19.5%). The mixture is allowed to solidify on a dry plate with exclusion of moisture and the resulting brittle polyisocyanate is pulverised. The polyisocyanate contains only a very small quantity of free toluylene diisocyanate and has good solubility in solvents normally used for isocyanates.

If 100 ml. of chlorobenzene are concurrently employed in the process of this example there is obtained an 81% solution of isocyanate in chlorobenzene with an isocyanate content of 14.5% (theoretical 16.0%).

33 parts by weight of this isocyanate solution are diluted with 10 ml. of acetic ester and combined with a mixture of 13.6 parts by weight of the polyester described in Example 1 and 5 ml. of glycol monomethyl ether acetate, coated on to glass and dried. After drying for 2 days at room temperature or from 1 to 2 hours at 110° C., a hard film is obtained which is resistant to solvents.

It twice the quantity of polyester is employed, an even harder solvent-resistant film is obtained after stoving at 220° C.

Example 14

119 parts by weight of phenyl isocyanate (1 mol) are added, with stirring and exclusion of moisture, to a mixture of 60 parts by weight of acetaldehyde diethyl acetal (0.5 mol) and 2 ml. of BF$_3$-etherate at a temperature of 100° C., the addition being effected over a period of 2 hours. A strong exothermic reaction immediately commences. When all the isocyanate has been added the isocyanate content of the reaction mixture is zero.

The reaction product is a dark brown mass which solidifies in crystalline form after standing for a relatively long period. The material has good solubility in conventional solvents and can be stoved with polyhydroxy compounds at a temperature of from 210° C. to 220° C. to give surface-hard lacquers.

Example 15

348 parts by weight (2 mols) of a toluylene diisocyanate mixture containing the 2,4- and 2,6-isomers in a ratio of 65:35 are heated, with exclusion of moisture, to 160° C. and then combined over a period of 3 hours with a mixture of 76 parts by weight of formaldehyde dimethyl acetal (1 mol) and 5 ml. of $BF_3$-etherate. The isocyanate content of the reaction mixture is 18.5% (theoretical 19.5%). 186 parts by weight of phenol are then added to the reaction mixture over a period of one hour and at a temperature of 150° C. The temperature of the reaction mixture is maintained at 150° C. for one hour and the product is then allowed to solidify with exclusion of moisture into a brittle resin. The product has a free isocyanate content of 2.0% and an isocyanate content which can be split off of 11.25%. (Total isocyanate content is therefore 13.25%; theoretical 13.65%.)

50 parts by weight of the resin thus obtained are dissolved in 50 parts by weight of glycol monomethyl ether acetate and to this solution is added a solution of 41 parts by weight of a polyester obtained from 3 mols of adipic acid, 1 mol of trimethylol propane and 3 mols of butylene-1,3-glycol having an acid number of 2.1 and a hydroxyl content of 6.5%, in 20 ml. of acetic ester and 10 ml. of toluene. The mixture is stoved on a metal surface at 170° C. and yields solvent-resistant coatings of good elasticity.

By employing twice the quantity of ester, a good but somewhat more brittle film can be obtained by stoving at a temperature of from 210° C. to 220° C.

*Example 16*

A monophenyl urethane of toluylene diisocyanate is prepared by heating a mixture of 348 parts by weight (2 mols) of a toluylene diisocyanate mixture containing the 2,4- and 2,6-isomers in a ratio of 65:35 and 186 parts by weight (2 mols) of phenol at a temperature of 150° C. with exclusion of moisture. A mixture of 76 parts by weight of formaldehyde dimethyl acetal (1 mol) and 8 ml. of $BF_3$-etherate is then added to the monophenyl urethane at a temperature of from 150° C. to 160° C. and over a period of 2 hours. A strong exothermic reaction takes place giving rise to a highly viscous mass which solidifies on cooling to a brittle resin whose properties correspond to those of the product obtained in Example 15. Isocyanate content=3.15%; isocyanate content which can be split off=11.95%; total isocyanate content=15.1%.

The product of this example may be transformed into a stoving lacquer by the procedure described in Example 15, the same results being obtained.

*Example 17*

250 parts by weight of a polyether isocyanate, which has been prepared from a linear polypropylene glycol having a molecular weight of 2000 and an excess of a toluylene diisocyanate mixture containing the 2,4- and 2,6-isomers in a ratio of 65:35 and having an isocyanate content of 8.36%, are mixed at room temperature with 9 ml. of $BF_3$-etherate and 47.5 parts by weight of a linear polyacetal derived from butane-1,4-dihydroxy ethyl glycol and formaldehyde having an OH number of 80. The mixture is placed in a container and heated for 45 minutes at a temperature of from 140 to 150° C. A solid plastic is thus obtained which is not affected by conventional solvents and which has elastic properties.

*Example 18*

15 parts by weight of polyhydroxy methylene having an average molecular weight of approximately 80,000 are swelled in the absence of moisture with 200 ml. of benzene and mixed at room temperature with 17.4 parts by weight of a toluylene diisocyanate mixture containing the 2,4- and 2,6-isomers in a ratio of 65:35 and 3 parts by weight of $BF_3$-etherate. The solution shows a slight exothermic reaction and becomes reddish-violet in colour. It is heated for 1 hour at 75° C. the free isocyanate groups disappearing completely. The product obtained is filtered off and yields, after drying, 9 parts by weight of a nitrogenous high-molecular substance which contains 0.83% N and which decomposes with decarboxylation and slight splitting off of formaldehyde on being heated to a temperature of 150° C.

*Example 19*

119 parts by weight of phenyl isocyanate (1 mol) and 3 ml. of $BF_3$-etherate are heated to 160° C. A mixture of 82 parts by weight of 4-phenyl-m-dioxane (0.5 mol) and 5 ml. of $BF_3$-etherate is then added to the phenyl isocyanate over a period of 2 hours. The temperature of the reaction mixture is maintained at 160° C. for 4 hours. On cooling, a highly viscous product with an isocyanate content of 2.6% is obtained.

*Example 20*

119 parts by weight of phenyl isocyanate (1 mol) and 2 ml. of $BF_3$-etherate are heated to 140° C. A mixture of 37 parts by weight of ethylene glycol methylene ether (0.5 mol) and 5 ml. of $BF_3$-etherate is then added dropwise to the phenyl isocyanate over a period of one hour. The temperature of the reaction mixture is maintained at 140° C. The isocyanate content decreases as the viscosity of the reaction mixture gradually rises and after two hours there is obtained a resin which is highly viscous at 140° C. and which has an isocyanate content of 3.5%. The resin solidifies on cooling to form a brittle but still soluble mass.

*Example 21*

Solutions of (a) 2.5 ml. of $BF_3$-etherate in 38 parts by weight of formaldehyde dimethyl acetal (0.5 mol) and (b) 177 parts by weight of m-isocyanatobenzoic acid methyl ester (1 mol) are added to 75 parts by weight of chlorobenzene heated to 130° C. with dissipation of the heat of reaction which is liberated. After all the isocyanate has been added, the isocyanate content of the reaction mixture is still 0.5%. The resulting 74% solution in chlorobenzene can be used as a polyfunctional component in, for example, trans-esterification reactions.

*Example 22*

438 parts by weight of a polyacetal isocyanate prepared by reacting 300 parts by weight of a polyacetal (obtained from 21 mols of triethylene glycol, 2 mols of trioxethylated trimethylol propane and formaldehyde) with 138 parts by weight of a toluylene diisocyanate mixture containing the 2,4 and 2,6-isomers in a ratio of 65:35 (isocyanate content 8.92%) are stirred at 40° C. with 8 ml. of $BF_3$-etherate. The mixture is then heated in a sheet metal box for 1 hour at a temperature of from 150° C. to 160° C. whereby a solid insoluble plastic is obtained.

*Example 23*

59.5 parts by weight of phenyl isocyanate (0.5 mol), 20 parts by weight of chlorobenzene and 2 ml. of $BF_3$-etherate are heated to 120° C., whereupon 50 parts by weight of formaldehyde diphenyl acetal (0.25 mol) are slowly added dropwise. A vigorous exothermic reaction takes place. A highly viscous chlorobenzene solution containing 85% solids is obtained, the solution having a content of 1.0% of free isocyanate and a content of 14.5% of isocyanate which can be split off.

32 parts by weight of the resulting solution are diluted with 5 ml. of glycol monomethyl ether acetate, then 15 parts by weight of the polyester described in Example 1 are added and the mixture is stoved for 30 minutes at a temperature of from 170° C. to 180° C. as a coating on a metal surface. A hard solvent-resistant film is thereby obtained.

What is claimed is:

1. A process for the production of novel condensation products which comprises reacting together, in contact with 0.1–30% by weight, based on the total weight of reactants, of a Friedel-Crafts catalyst, an organic isocyanate selected from the group consisting of mono- and polyisocyanates with a compound containing an acetal group having one of the formulae:

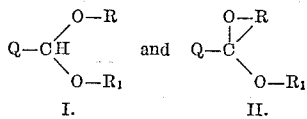

wherein R and $R_1$ are each hydrocarbon radicals, while Q is selected from the group consisting of a hydrocarbon radical and hydrogen, and wherein $R_1$ may, in Formula I, be connected to R through a heterocyclic ring, the reactive groups participating in the condensation reaction being an —NCO group of the isocyanate and at least one of the —OR and —$OR_1$ substituents of the acetal groups.

2. Process of claim 1 wherein the organic isocyanate is a monoisocyanate.

3. Process of claim 1 wherein the organic isocyanate is a polyisocyanate.

4. Process of claim 1 wherein the acetal group is linear.

5. Process of claim 1 wherein the acetal group is cyclic.

6. Process of claim 1 wherein the said compound containing an acetal group contains at least one linear acetal group and at least one cyclic acetal group.

7. A new condensation product obtained by the process of claim 1.

8. A new condensation product obtained by the process of claim 2.

9. A new condensation product obtained by the process of claim 3.

10. A new condensation product obtained by the process of claim 4.

11. A new condensation product obtained by the process of claim 5.

12. A new condensation product obtained by the process of claim 6.

References Cited in the file of this patent
UNITED STATES PATENTS

| | | |
|---|---|---|
| 2,277,083 | Dorough | Mar. 24, 1942 |
| 2,897,181 | Windemuth | July 28, 1959 |
| 2,961,428 | Muller et al. | Nov. 22, 1960 |
| 3,021,289 | Muller | Feb. 13, 1962 |